US011861071B2

United States Patent
Zhang (10) Patent No.: US 11,861,071 B2
(45) Date of Patent: Jan. 2, 2024

(54) LOCAL PERSPECTIVE METHOD AND DEVICE OF VIRTUAL REALITY EQUIPMENT AND VIRTUAL REALITY EQUIPMENT

(71) Applicant: Qingdao Pico Technology Co., Ltd., Shandong (CN)

(72) Inventor: Ming Zhang, Shandong (CN)

(73) Assignee: QINGDAO PICO TECHNOLOGY CO., LTD., Shandong Province (CN)

( * ) Notice: Subject to any disclaimer, the term of this patent is extended or adjusted under 35 U.S.C. 154(b) by 0 days.

(21) Appl. No.: 17/817,792

(22) Filed: Aug. 5, 2022

(65) Prior Publication Data

US 2022/0382380 A1 Dec. 1, 2022

Related U.S. Application Data

(63) Continuation of application No. PCT/CN2021/132144, filed on Nov. 22, 2021.

(30) Foreign Application Priority Data

Nov. 23, 2020 (CN) .......................... 202011319048.0

(51) Int. Cl.
*G06F 3/01* (2006.01)
*G06V 20/20* (2022.01)
(Continued)

(52) U.S. Cl.
CPC ........... *G06F 3/017* (2013.01); *G02B 27/017* (2013.01); *G02B 27/0179* (2013.01);
(Continued)

(58) Field of Classification Search
CPC ...................................................... G06F 3/017
See application file for complete search history.

(56) References Cited

U.S. PATENT DOCUMENTS 10,656,720 B1 * 5/2020 Holz ................... G06F 3/011
10,747,371 B1 * 8/2020 Kulbida ............... G06F 3/0425
(Continued)

FOREIGN PATENT DOCUMENTS

CN 105324738 A 2/2016
CN 106845335 A 6/2017
(Continued)

OTHER PUBLICATIONS

Notification to Grant issued in Chinese Patent Application No. 202011319048.0, dated Aug. 31, 2022 (4 pages).
(Continued)

*Primary Examiner* — Di Xiao
(74) *Attorney, Agent, or Firm* — BUCHANAN INGERSOLL & ROONEY PC (57) ABSTRACT

A local perspective method and device of a virtual reality equipment and a virtual reality equipment are disclosed. The method comprises: identifying a user's hand action; triggering a local perspective function of the virtual reality equipment if the user's hand action satisfies a preset trigger action; and under the local perspective function, determining a local perspective display area in a virtual scene according to a position of the user's hand action, so as to display a real scene in the local perspective display area. The local perspective method of the virtual reality equipment according to the present disclosure can determine the range of the area to be perspectively displayed by using the user's hand action. Compared with the conventional global perspective solution, it can be applicable to more and richer application scenarios, and can greatly improve the user's use experience.

15 Claims, 5 Drawing Sheets

(51) Int. Cl.
*G06V 40/10* (2022.01)
*G06V 40/20* (2022.01)
*G02B 27/01* (2006.01)

(52) U.S. Cl.
CPC .............. *G06V 20/20* (2022.01); *G06V 40/10* (2022.01); *G06V 40/28* (2022.01); *G02B 2027/0178* (2013.01); *G02B 2027/0187* (2013.01)

(56) References Cited

U.S. PATENT DOCUMENTS

| | | | |
|---|---|---|---|
| 2006/0017654 A1* | 1/2006 | Romo | G06F 3/016 345/592 |
| 2014/0361976 A1 | 12/2014 | Osman et al. | |
| 2016/0054565 A1 | 2/2016 | Izumihara et al. | |
| 2017/0256096 A1* | 9/2017 | Faaborg | G06T 19/003 |
| 2017/0287215 A1 | 10/2017 | Lalonde et al. | |
| 2018/0342103 A1* | 11/2018 | Schwarz | G06F 3/04845 |
| 2019/0320138 A1 | 10/2019 | Kaufthal | |
| 2019/0332182 A1 | 10/2019 | Shen et al. | |
| 2019/0369722 A1* | 12/2019 | Lehtiniemi | G06F 3/0304 |
| 2019/0385368 A1* | 12/2019 | Cartwright | G06F 3/017 |
| 2021/0004146 A1* | 1/2021 | Linville | G06F 3/0304 |
| 2021/0132693 A1* | 5/2021 | Pulli | H04N 13/398 |
| 2021/0233312 A1* | 7/2021 | Noris | G02B 27/0172 |

FOREIGN PATENT DOCUMENTS

| | | |
|---|---|---|
| CN | 107272207 A | 10/2017 |
| CN | 108646997 A | 10/2018 |
| CN | 108700936 A | 10/2018 |
| CN | 110275619 A | 9/2019 |
| CN | 111708432 A | 9/2020 |
| CN | 112445341 A | 3/2021 |
| CN | 112462937 A | 3/2021 |

OTHER PUBLICATIONS

First Office Action issued in corresponding Patent Application No. 2020113190480 dated Nov. 23, 2020.

International Search Report (PCT/ISA/210) with English translation and Written Opinion (PCT/ISA/237) dated Feb. 8, 2022, by the Chinese Patent Office as the International Searching Authority for International Application No. PCT/CN2021/132144.

Office Action issued in corresponding Patent Application No. 2020113190480 dated Nov. 23, 2020.

* cited by examiner

LOCAL PERSPECTIVE METHOD AND DEVICE OF VIRTUAL REALITY EQUIPMENT AND VIRTUAL REALITY EQUIPMENT

CROSS REFERENCE TO RELATED APPLICATIONS

This application is entered as a bypass continuation application under 35 U.S.C. § 111(a) of International Application No. PCT/CN2021/132144, filed on Nov. 22, 2021, which claims priority to Chinese Patent Application No. 202011319048.0, filed on Nov. 23, 2020. The embodiments of the earlier-filed applications are hereby incorporated herein in their entirety by reference.

TECHNICAL FIELD

The present disclosure relates to the field of virtual reality technology, in particular to a local perspective method and device of a virtual reality equipment and a virtual reality equipment.

BACKGROUND

Virtual reality glasses (hereinafter referred to as "VR glasses") are a fully immersive experience device, so the external information cannot be perceived during the process of use. However, during the process of actual use, users often encounter the situation that they need to learn the external information in a short time, for example, drinking water, operating mobile phones, communicating with people, etc.

VR glasses in the prior art generally have camera-based perspective function. However, the current perspective functions are mostly perspective display of the whole fields of view, and in the perspective mode, users can no longer see the content of the virtual scene, and there is only the external real world scene in front of them. This completely switching way will greatly affect the user experience, especially in scenarios such as movie viewing.

SUMMARY

In view of this, the main object of the present disclosure is to provide a local perspective method and device of a virtual reality equipment and a virtual reality equipment, to solve the technical problem of poor user experience caused by the perspective method of conventional virtual reality equipment.

According to a first aspect of the present disclosure, a local perspective method of a virtual reality equipment is provided, which comprises:

identifying a user's hand action;

triggering a local perspective function of the virtual reality equipment if the user's hand action satisfies a preset trigger action; and under the local perspective function, determining a local perspective display area in a virtual scene according to a position of the user's hand action, so as to display a real scene in the local perspective display area.

According to a second aspect of the present disclosure, a local perspective device of a virtual reality equipment is provided, which comprises:

a hand action identification unit for identifying a user's hand action;

a local perspective function triggering unit for triggering a local perspective function of the virtual reality equipment if the user's hand action satisfies a preset trigger action; and a local perspective display area determination unit for, under the local perspective function, determining a local perspective display area in a virtual scene according to a position of the user's hand action, so as to display a real scene in the local perspective display area.

According to a third aspect of the present disclosure, a virtual reality equipment is provided, which comprises a processor and a memory for storing computer executable instructions, wherein when executed by the processor, the executable instructions implement the local perspective method of the virtual reality equipment as stated above.

According to a fourth aspect of the present disclosure, there is provided a computer readable storage medium that stores one or more programs that, when executed by a processor, implement the local perspective method of the virtual reality equipment as stated above.

By adopting at least one of the above technical solutions, the present disclosure can achieve the following beneficial effects.

In the local perspective method of the virtual reality equipment according to the embodiments of the present disclosure, the user's hand action is identified firstly; then, the user's hand action is compared with a preset trigger action, so as to determine whether the user wants to trigger the local perspective function of the virtual reality equipment; if the user's hand action matches the preset trigger action, the local perspective function of the virtual reality equipment can be triggered; then, under the local perspective function, the range of the area to be perspectively displayed in the virtual scene can be further determined according to the position corresponding to the user's hand action, so that the user can perform the corresponding operation in the real scene through the local perspective display area without interrupting the user's immersive experience of the virtual scene. The local perspective method of the virtual reality equipment according to the embodiments of the present disclosure can determine the range of the area to be perspectively displayed by using the user's hand action. Compared with the conventional global perspective solution, it can be applicable to more and richer application scenarios, and can greatly improve the user's use experience.

BRIEF DESCRIPTION OF DRAWINGS

By reading the detailed description of the preferred embodiments below, various other advantages and benefits will become clear to a person of ordinary skill in the art. The drawings are only used for the purpose of illustrating the preferred embodiments, and should not be considered as a limitation to the present disclosure. Moreover, throughout the drawings, the same reference numerals are used to denote the same components. In the drawings.

DETAILED DESCRIPTION

Illustrative embodiments of the present disclosure will be described in more detail below with reference to the accompanying drawings. These embodiments are provided to understand the present disclosure more thoroughly and to fully convey the scope of the present disclosure to a person skilled in the art. Although illustrative embodiments of the present disclosure are shown in the accompanying drawings, it should be understood that the present disclosure can be implemented in various forms and should not be limited by the embodiments illustrated herein.

Virtual reality technology is a computer simulation system that can create and experience a virtual world. It uses a computer to generate a simulation environment and makes users immerse in this environment. Virtual reality technology uses the data from real life to generate electronic signals by computer technology, combines them with various output devices to transform them into phenomena that people can perceive. These phenomena may be real objects in reality, or objects that cannot be seen by our flesh eyes but are expressed through three-dimensional models.

The virtual reality equipment in the present disclosure may refer to VR glasses. VR glasses use the head mounted display device to isolate people's vision and hearing from the outside world and guide the user to produce a feeling of being in the virtual environment. Its display principle is that the screens for left and right eyes display the images for the left and right eyes respectively, and a three-dimensional feeling is generated in the mind after the human eyes acquire these different information. For convenience of description, the present disclosure will be described below by taking VR glasses as a specific application example of the virtual reality equipment.

Figure 1:
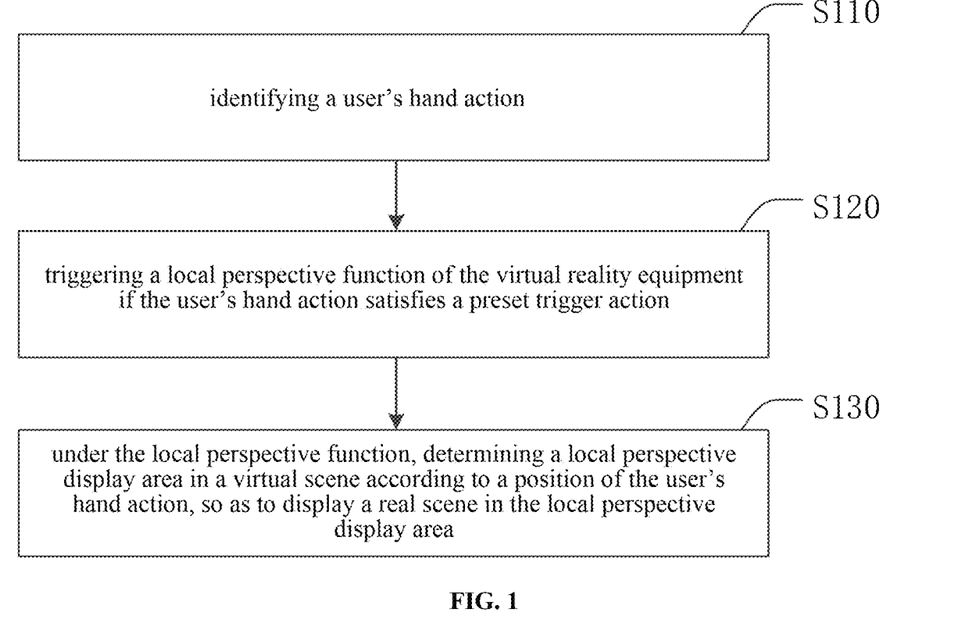
FIG. 1 is a schematic flowchart of a local perspective method of a virtual reality equipment according to an embodiment of the present disclosure.

FIG. 1 shows a schematic flowchart of a local perspective method of a virtual reality equipment according to an embodiment of the present disclosure. Referring to FIG. 1, the local perspective method of the virtual reality equipment according to an embodiment of the present disclosure comprises the following steps S110 to S130.

In step S110, a user's hand action is identified.

Figure 2:
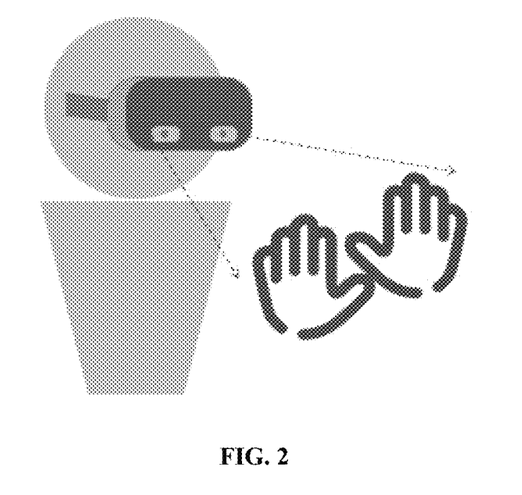
FIG. 2 is a schematic diagram of the wearing state of a virtual reality equipment according to an embodiment of the present disclosure.

In the local perspective display of the virtual reality equipment, a user's hand action may be identified firstly. As shown in FIG. 2, generally, the conventional VR glasses are equipped with a binocular camera at the external front end of the glasses, which is used to collect the external environment information and capture the user's posture and motion information, such as hand action information. In the conventional virtual reality application scenarios, computer vision technology is usually used for hand action identification. The results of hand action identification are often used for user interface operation based on the hand action, or some hand sensory games. In the embodiments of the present disclosure, the information collected by the camera installed in the conventional VR glasses may also be used to identify the user's hand action, so as to perform local perspective display according to the hand action.

It should be noted that, in addition to the above binocular camera for collecting hand action information, monocular camera or other types of camera may also be used. The specific type of camera can be flexibly set by a person skilled in the art according to the actual needs, which is not specifically limited here.

When using computer vision technology for hand action identification, the following methods may be used. Firstly, the hand action features and hand action model are designed, the hand action samples are used to extract the features, the hand action model is trained, and finally the hand action model is established. On this basis, a new hand action image is collected by the binocular camera and preprocessed; then, the hand action image is segmented so as to accurately extract the human hand part in the image; then, the hand action feature is extracted; finally, the input hand actions are classified and identified by using the previously established hand action model.

Of course, besides the above identification method, a person skilled in the art can also select other methods for hand action identification according to actual needs, which is not specifically limited here.

In addition, the above identification of the user's hand action can be real-time identification to facilitate timely response to the user's needs. Of course, for the purpose of saving power of the equipment, the hand action may be identified at a preset time interval. The specific frequency used to identify the hand action can be flexibly set by a person skilled in the art according to the actual needs, which is not specifically limited here.

In step S120, if the user's hand action satisfies a preset trigger action, a local perspective function of the virtual reality equipment is triggered.

After obtaining the user's hand action, it is necessary to further determine whether the user's hand action is an action to trigger the local perspective function of VR glasses. Therefore, the user's hand action identified may be matched with the preset trigger action. If the matching is successful, the local perspective function of VR glasses can be triggered at this point. The type of preset trigger action may be flexibly set by a person skilled in the art according to the actual needs, and is not specifically limited here.

It should be noted that "triggering the local perspective function of the virtual reality equipment" in this step can be understood as that only the local perspective function of VR glasses is triggered, and VR glasses have not actually entered the perspective state, that is, at present the user cannot see the real scene, and subsequent steps are needed to determine the local perspective display area in the virtual scene. Of course, it can also be understood that the VR glasses have entered the perspective state, and at present the user can see the real scene, but in order to avoid too much influence on the user's immersive experience, the local perspective display area in the virtual scene can be re-determined through subsequent steps.

In step S130, under the local perspective function, the local perspective display area in the virtual scene is determined according to the position of the user's hand action, so as to display a real scene in the local perspective display area.

Figure 3:
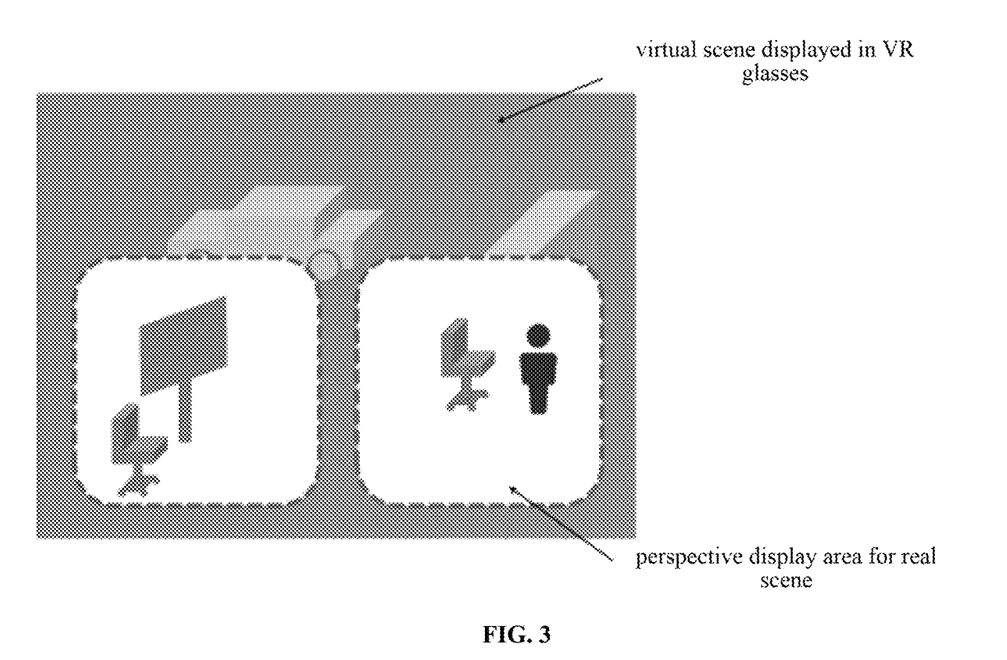
FIG. 3 is a schematic diagram of a local perspective display area in a virtual scene according to an embodiment of the present disclosure.

When determining the local perspective display area in the virtual scene, the position of the hand action can be determined by using the user's hand action obtained in the above steps, and then the local perspective display area can be determined according to the specific position of the user's hand action. As shown in FIG. 3, the user can see the real scene through the local perspective display area, while the user can still see the virtual scene at remaining parts other than the local perspective area.

The local perspective method of the virtual reality equipment according to the embodiments of the present disclosure can determine the range of the area to be perspectively displayed by using the user's hand action. Compared with the conventional global perspective solution, it can be applicable to more and richer use scenarios, and can greatly improve the user's use experience.

In an embodiment of the present disclosure, the preset trigger action includes a one-hand trigger action. The step of, under the local perspective function, determining the local perspective display area in the virtual scene according to the position of the user's hand action comprises: if the user's one-hand action satisfies the one-hand trigger action, determining positions of an index finger and a thumb of the user's one-hand action; and generating a circular perspective display area in the virtual scene according to the positions of the index finger and the thumb of the user's one-hand action.

Figure 4:
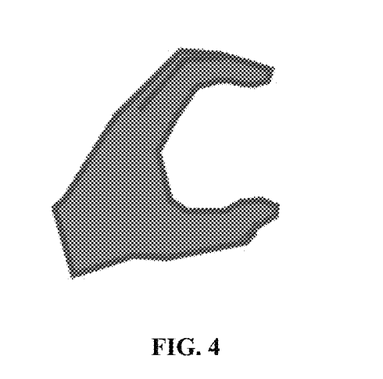
FIG. 4 is a schematic diagram of a one-hand trigger action according to an embodiment of the present disclosure.
Figure 5:
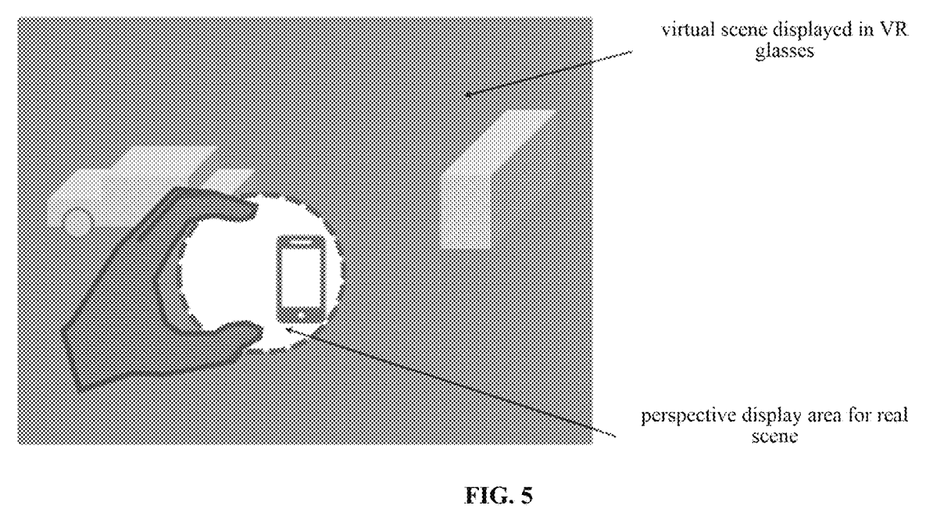
FIG. 5 is a schematic diagram of a circular perspective display area in a virtual scene according to an embodiment of the present disclosure.

In the embodiments of the present disclosure, the preset trigger action may be a one-hand trigger action. As shown in FIG. 4 which shows a schematic diagram of a one-hand trigger action, the palm of the user's one-hand is bent inward, and the thumb is opposite to the other four fingers to make an action similar to the "C" shape. In order to generate a more accurate local perspective display area later, if the user's hand action identified satisfies the above one-hand trigger action, the positions of the index finger and the thumb corresponding to the user's one-hand action may be further determined, and then according to the positions of the index finger and the thumb, a circular perspective display area as shown in FIG. 5 is formed between the index finger and the thumb of one-hand.

For example, in the scenario when the user wants to use the mobile phone or take a water cup, the real scene captured by the camera on the VR glasses will be perspectively displayed in the above circular perspective display area. The user can operate the mobile phone or pick up the water cup through the circular perspective display area, and the circular perspective display area can move with the movement of the user's hand.

In an embodiment of the present disclosure, the preset trigger action includes a two-hand trigger action. The step of, under the local perspective function, determining the local perspective display area in the virtual scene according to the position of the user's hand action comprises: if the user's two-hand action satisfies the two-hand trigger action, determining positions of two index fingers and two thumbs of the user's two-hand action; and generating a triangular perspective display area in the virtual scene according to the positions of the two index fingers and the two thumbs of the user's two-hand action.

Figure 6:
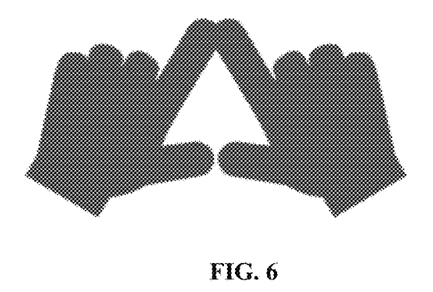
FIG. 6 is a schematic diagram of a two-hand trigger action according to an embodiment of the present disclosure.
Figure 7:
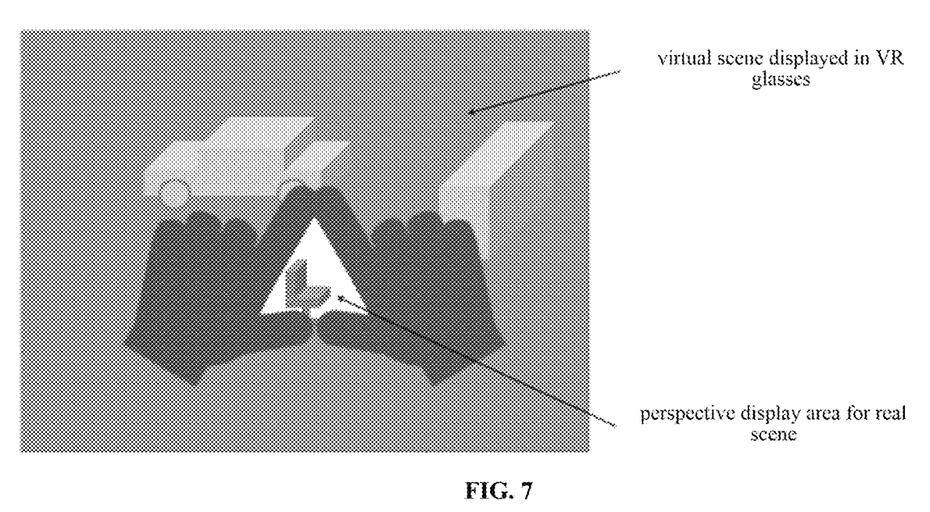
FIG. 7 is a schematic diagram of a triangular perspective display area in a virtual scene according to an embodiment of the present disclosure.

In the embodiments of the present disclosure, the preset trigger action may also be a two-hand trigger action. As shown in FIG. 6 which shows a schematic diagram of a two-hand trigger action, the user's left thumb is in contact with the right thumb, the left index finger is in contact with the right index finger, all of them are located on a same plane, and other fingers may be bent and retracted or expanded, so that the area surrounded by the left thumb, the right thumb, the left index finger and the right index finger is a triangular area. In order to generate a more accurate local perspective display area later, if the user's two-hand action identified satisfies the above two-hand trigger action, the positions of the two index fingers and two thumbs corresponding to the user's two-hand action can be further determined, and then according to the positions of the two index fingers and two thumbs, a triangular perspective display area as shown in FIG. 7 is formed between the positions of two index fingers and two thumbs.

For example, in the scenario when the user needs to find something, perspective display may need to be performed in a larger range. The above triangular perspective display area will perspectively display the real scene captured by the camera on VR glasses. As the user's hands move towards both sides, the range of triangular perspective display area will gradually increase, so that users can find the things in time.

In an embodiment of the present disclosure, in addition to determining the local perspective display area in the virtual scene based on the two trigger actions listed above, other trigger actions may also be flexibly set according to the actual needs. For example, the user may draw a track having a defined shape in front of his/her eyes, and the area surrounded by the track can be regarded as the area where the user wants to perform perspective display. For example, if the track drawn by the user is a square track, the area surrounded by the square track can be perspectively displayed in the virtual scene formed by VR glasses.

In an embodiment of the present disclosure, in order to prevent the user from triggering the local perspective display function of VR glasses by mistake, when the user's hand action satisfies the preset trigger action, more complicated trigger conditions may be further set. For example, the duration of the user's hand trigger action identified can be counted. If a preset time threshold is exceeded, it is considered that the user wants to trigger the local perspective display function of VR glasses. Alternatively, the number of times of performing the user's hand trigger action may be counted. If it reaches a preset number of times of performing, it is considered that the user wants to trigger the local perspective display function of VR glasses. Regarding how to specifically set the trigger conditions of the local perspective function, it can be flexibly set by a person skilled in the art according to the actual situation, which will not be listed here one by one.

In an embodiment of the present disclosure, the method further comprises: determining whether the position of the user's hand action has changed; and if it has changed, updating the local perspective display area in the virtual scene according to a changed position of the user's hand action.

In the actual application scenarios, the user's hand position may change in real time. When the hand position changes greatly, if the local perspective display area is still determined according to the user's hand position before the change, it may occur that the local perspective display area cannot be fully matched with the user's hand. That is, the user may not be able to see what they want to see in the local perspective display area, or can only see part of it. Therefore, in the embodiment of the present disclosure, the position change of the user's hand action may be detected in real time. When the position change of the user's hand action has been detected, the local perspective display area may be re-determined according to the changed position of the user's hand action.

In an embodiment of the present disclosure, the method further comprises: if the user's hand action satisfies a preset turning-off action, turning off the local perspective function of the virtual reality equipment.

In the actual application scenarios, the user's demand to trigger the local perspective display function of VR glasses may be only temporary, such as temporarily answering a phone, temporarily drinking a cup of water, etc. Therefore, in order to ensure that the user can quickly return to the immersive experience of the virtual scene from the local perspective display function state, it may also be detected whether the user has made a hand action to turn off the local perspective function of VR glasses. If it is detected that the user's hand action matches the preset turning-off action, the local perspective display function of VR glasses may be turned off at this point.

Figure 8:
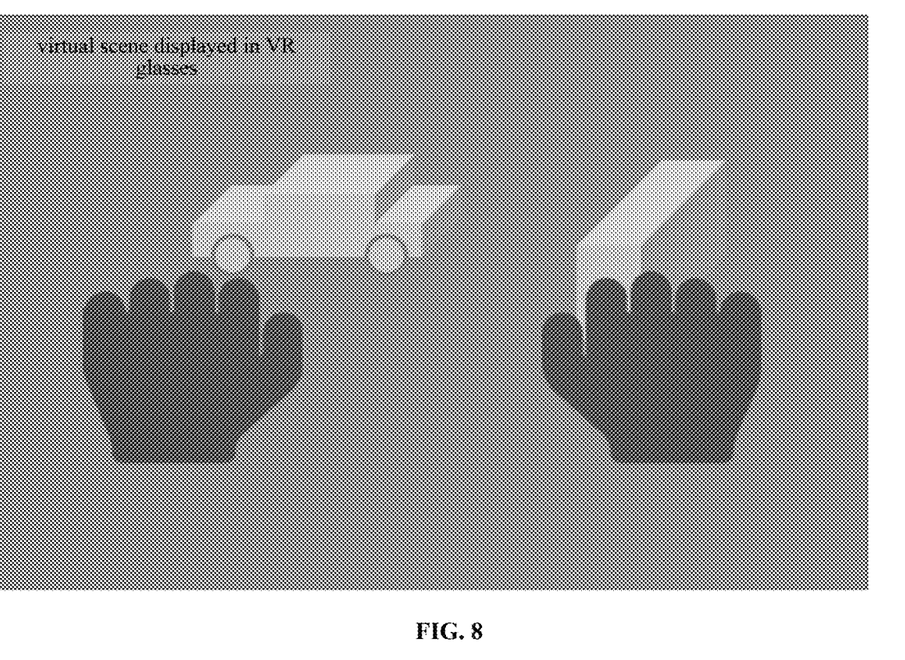
FIG. 8 is a schematic diagram of a preset turning-off action according to an embodiment of the present disclosure.

As shown in FIG. 8, which shows a schematic diagram of a preset turning-off action. The user can turn off the local perspective display function of VR glasses by making an action of clenching his hands in front of his eyes. Of course, in addition to turning-off the local perspective display area in the virtual scene based on the preset turning-off action shown in FIG. 8, other turning-off actions can also be flexibly set according to the actual needs, which are not specifically limited here.

In an embodiment of the present disclosure, similar to the trigger conditions of the local perspective display function, in order to prevent the user from turning-off the local perspective display function by mistake, more complicated turning-off conditions may be further set when the user's hand action satisfies the preset turning-off action. For example, the duration of the user's hand turning-off action identified can be counted. If a preset time threshold is exceeded, it is considered that the user wants to turn off the local perspective display function of VR glasses. Alternatively, the number of times of performing the user's hand turning-off action may be counted. If it reaches a preset number of times of performing, it is considered that the user wants to turn off the local perspective display function of VR glasses. Regarding how to specifically set the turning-off conditions of the local perspective function, it can be flexibly set by a person skilled in the art according to the actual situation, which will not be listed here one by one.

Figure 9:
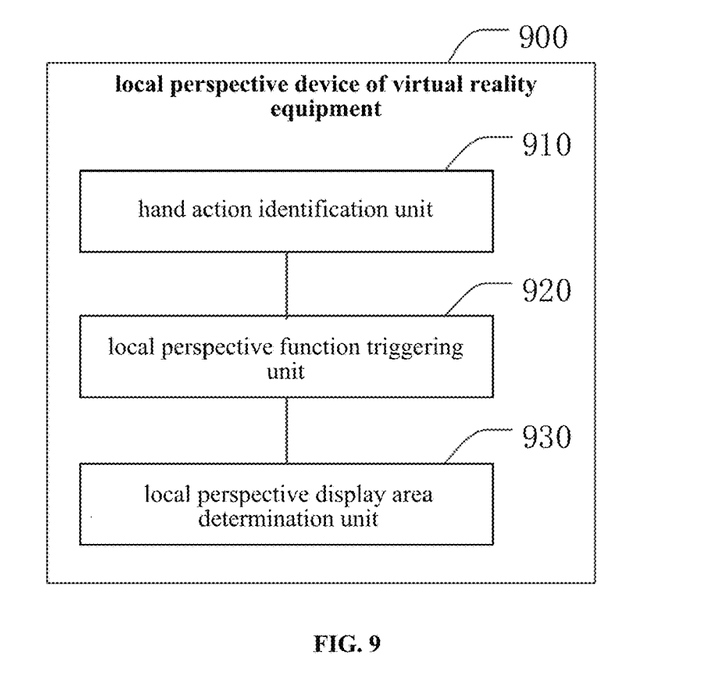
FIG. 9 is a block diagram of a local perspective device of a virtual reality equipment according to an embodiment of the present disclosure.

An embodiment of the present disclosure also provides a local perspective device of a virtual reality equipment, which belongs to the same technical concept as the local perspective method of the virtual reality equipment. FIG. 9 shows a block diagram of a local perspective device of a virtual reality equipment according to an embodiment of the present disclosure. Referring to FIG. 9, the local perspective device of the virtual reality equipment 900 comprises a hand action identification unit 910, a local perspective function triggering unit 920 and a local perspective display area determination unit 930.

The hand action identification unit 910 is for identifying a user's hand action. The local perspective function triggering unit 920 is for triggering a local perspective function of the virtual reality equipment if the user's hand action satisfies a preset trigger action.

The local perspective display area determination unit 930 is for, under the local perspective function, determining a local perspective display area in a virtual scene according to a position of the user's hand action, so as to display a real scene in the local perspective display area.

In an embodiment of the present disclosure, the preset trigger action includes a one-hand trigger action, and the local perspective display area determination unit 930 is specifically for: if the user's one-hand action satisfies the one-hand trigger action, determining positions of the index finger and the thumb of the user's one-hand action; and generating a circular perspective display area in the virtual scene according to the positions of the index finger and the thumb of the user's one-hand action.

In an embodiment of the present disclosure, the preset trigger action includes a two-hand trigger action, and the local perspective display area determination unit 930 is specifically for: if the user's two-hand action satisfies the two-hand trigger action, determining positions of two index fingers and two thumbs of the user's two-hand action; and generating a triangular perspective display area in the virtual scene according to the positions of two index fingers and two thumbs of the user's two-hand action.

In an embodiment of the present disclosure, the device further comprises: a position change determination unit for determining whether the position of the user's hand action has changed; and a local perspective display area updating unit for updating the local perspective display area in the virtual scene according to a changed position of the user's hand action if the position of the user's hand action has changed.

In an embodiment of the present disclosure, the device further comprises a local perspective function turning-offing unit for, if the user's hand action satisfies a preset turning-off action, turning off the local perspective function of the virtual reality equipment.

Figure 10:
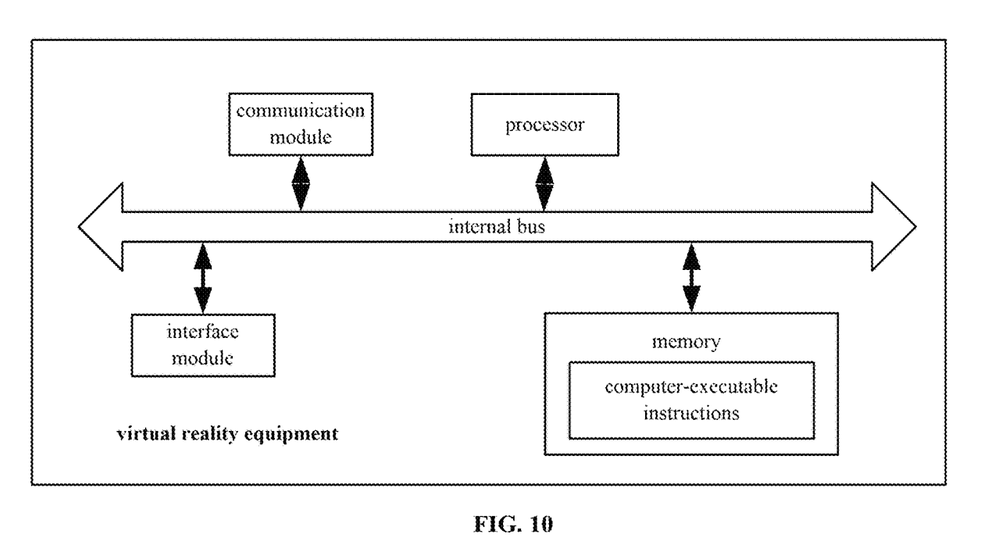
FIG. 10 is a schematic diagram of the structure of a virtual reality equipment in an embodiment of the present disclosure.

FIG. 10 is a schematic diagram of the structure of a virtual reality equipment. Referring to FIG. 10, at the hardware level, the virtual reality equipment comprises: a memory, a processor, and optionally an interface module, a communication module, etc. The memory may include an internal memory, such as a high-speed random access memory (RAM), or a non-volatile memory, such as at least one disk memory, etc. Of course, the virtual reality equipment may also include other hardware as required.

The processor, the interface module, the communication module and the memory may be interconnected through an internal bus. The internal bus may be ISA (industry standard architecture) bus, PCI (peripheral component interconnect) bus or EISA (extended industry standard architecture) bus, etc. The bus may be divided into an address bus, a data bus, a control bus, etc. For ease of representation, only one bidirectional arrow is used in FIG. 10, but it does not mean that there is only one bus or one type of bus.

The memory is used to store computer executable instructions. The memory provides the computer executable instructions to the processor through the internal bus.

The processor executes the computer executable instructions stored in the memory and is specifically used to implement the following operations:

identifying a user's hand action;

triggering a local perspective function of the virtual reality equipment if the user's hand action satisfies a preset trigger action; and under the local perspective function, determining a local perspective display area in a virtual scene according to a position of the user's hand action, so as to display a real scene in the local perspective display area.

The functions performed by the local perspective device of the virtual reality equipment disclosed in the embodiment shown in FIG. 9 of the present disclosure can be applied to the processor or implemented by the processor. The processor may be an integrated circuit chip having signal processing capabilities. In the implementation process, the steps of the method described above can be completed by integrated logic circuits (in the form of hardware) or instructions (in the form of software) in the processor. The processor may be a general-purpose processor including a central processing unit (CPU), a network processor (NP), etc.; it may also be a digital signal processor (DSP), an application specific dedicated integrated circuit (ASIC), a field-programmable gate array (FPGA) or other programmable logic devices, discrete gates or transistor logic devices, discrete hardware components, which can implement or execute the methods, steps, and logical block diagrams disclosed in the embodiments of this specification. The general-purpose processor may be a microprocessor or any conventional processor or the like. The steps of the method disclosed in the embodiments of this specification can be directly embodied as hardware and executed by a decoding processor, or executed by a combination of hardware in the decoding processor and software modules. The software module can be located in a storage medium well known in the art such as random access memory, flash memory, read-only memory, programmable read-only memory, or electrically erasable programmable memory, registers, etc. The storage medium is located in the memory, and the processor reads the information in the memory and cooperates with its hardware to complete the steps of the above method.

The virtual reality equipment can also perform the steps performed by the local perspective method of the virtual reality equipment in FIG. 1, and realize the function of the local perspective method of the virtual reality equipment in the embodiment shown in FIG. 1, which will not be repeated here in the embodiment of the present disclosure.

An embodiment of the present disclosure further provides a computer readable storage medium, which stores one or more programs. When executed by the processor, the one or more programs implement the local perspective method of the virtual reality equipment as stated above. Specifically, it is used to execute the following operations:

identifying a user's hand action;

triggering a local perspective function of the virtual reality equipment if the user's hand action satisfies a preset trigger action; and under the local perspective function, determining a local perspective display area in a virtual scene according to a position of the user's hand action, so as to display a real scene in the local perspective display area.

A person skilled in the art should understand that the embodiments of the present disclosure may be provided as a method, a system, or a computer program product. Thus, the present disclosure may take the form of an entirely hardware embodiment, an entirely software embodiment, or an embodiment combining software and hardware. Furthermore, the present disclosure may take the form of a computer program product embodied on one or more computer-usable storage media (including, but not limited to, disk storage, CD-ROMs, optical memories, etc.) having computer-usable program code recorded thereon.

The present disclosure is described with reference to flowcharts and/or block diagrams of the method, the device (system), and the computer program product according to the embodiments of the present disclosure. It should be understood that each flow and/or block in the flowcharts and/or block diagrams, and combinations of the flows and/or blocks in the flowcharts and/or block diagrams may be implemented by computer program instructions. The computer program instructions may be provided to a processor of a general purpose computer, a special purpose computer, an embedded processor, or other programmable data processing device to generate a machine for implementing the functions specified in one or more flows of a flowchart or and/or one or more blocks of a block diagram by instructions executed by the processor of the computer or the other programmable data processing device.

These computer program instructions may also be stored in a computer readable memory capable of guiding a computer or other programmable data processing device to work in a specific manner, so that the instructions stored in the computer readable memory generate a manufactured product including an instruction device that implements the functions specified in one or more flows of a flowchart or and/or one or more blocks of a block diagram.

These computer program instructions may also be loaded on a computer or other programmable data processing device so that a series of operation steps are performed on the computer or other programmable device to produce computer implemented processing, so that the instructions executed on the computer or other programmable device provide steps for implementing the functions specified in one or more flows of a flowchart or and/or one or more blocks of a block diagram.

In a typical configuration, a computing device includes one or more processors (CPUs), input/output interfaces, network interfaces, and memory.

The memory may include non-permanent memory, random access memory (RAM) and/or nonvolatile memory in computer readable media, such as read only memory (ROM) or flash RAM. The memory is an example of computer readable media.

Computer readable media include permanent and non-permanent, removable and non-removable media, and information storage can be realized by any method or technology. Information can be computer readable instructions, data structures, modules of programs or other data. Examples of computer storage media include, but are not limited to, phase change memory (PRAM), static random access memory (SRAM), dynamic random access memory (DRAM), other types of random access memory (RAM), read only memory (ROM), electrically erasable programmable read only memory (EEPROM), flash memory or other memory technologies, read only disc read only memory (CD-ROM), digital versatile disc (DVD) or other optical storage, magnetic tape cartridge, magnetic tape magnetic disk storage or other magnetic storage device, or any other non-transmission medium, which can be used to store information that can be accessed by computing devices. As defined herein, computer readable media does not include temporary computer readable media, such as modulated data signals and carriers.

It should be noted that the terms "comprise", "include" or any other variations thereof are non-exclusive or open-ended, so that a process, method, article, or device including a series of elements includes not only those elements listed but also includes unspecified elements as well as elements that are inherent to such a process, method, article, or device. In the case that there is no more limitation, the phrase "comprising a . . . " does not exclude that the process, method, article, or device including the named element further includes additional named element.

The above only describes preferred embodiments of the present disclosure and is not intended to limit the scope of the present disclosure. For a person skilled in the art, the present disclosure may have various changes and changes. Any modifications, equivalent substitutions, improvements, etc. made within the spirit and principle of the present disclosure should all fall into the protection scope of the present disclosure.

What is claimed is:

1. A local perspective method of a virtual reality equipment, comprising:
    identifying a user's hand action;
    triggering a local perspective function of the virtual reality equipment when the user's hand action satisfies a preset trigger action;
    under the local perspective function, determining a local perspective display area in a virtual scene according to a position of the user's hand action, so as to display a real scene in the local perspective display area, wherein determining the local perspective display area comprises:
        determining a position of at least one finger in the user's hand action, and
        determining the local perspective display area in the virtual scene according to the position of at least one finger in the user's hand action, wherein determining the local perspective display area in the virtual scene according to the position of at least one finger in the user's hand action comprises: determining a shape and a position of the local perspective display area according to the position of at least one finger in the user's hand action, and determining the local perspective display area in the virtual scene according to the shape and the position of the local perspective display area and the position of at least one finger in the user's hand action;
    determining whether the position of the user's hand action has changed; and
    when the position of the user's hand action has changed, updating the local perspective display area in the virtual scene according to a changed position of the user's hand action.

2. The method according to claim 1, wherein the preset trigger action includes a one-hand trigger action, and
    under the local perspective function, determining a local perspective display area in a virtual scene according to a position of the user's hand action comprises:
        when the user's one-hand action satisfies the one-hand trigger action, determining positions of an index finger and a thumb of the user's one-hand action; and
        generating a circular perspective display area in the virtual scene according to the positions of the index finger and the thumb of the user's one-hand action.

3. The method according to claim 1, wherein the preset trigger action includes a two-hand trigger action, and
    under the local perspective function, determining a local perspective display area in a virtual scene according to a position of the user's hand action comprises:
        when the user's two-hand action satisfies the two-hand trigger action, determining positions of two index fingers and two thumbs of the user's two-hand action
        generating a triangular perspective display area in the virtual scene according to the positions of the two index fingers and the two thumbs of the user's two-hand action.

4. The method according to claim 1, further comprising:
    when the user's hand action satisfies a preset turning-off action, turning off the local perspective function of the virtual reality equipment.

5. The method according to claim 1, wherein triggering a local perspective function of the virtual reality equipment when the user's hand action satisfies a preset trigger action comprising:
    counting a duration of the user's hand trigger action when the user's hand action satisfies the preset trigger action; and
    triggering the local perspective function of the virtual reality equipment when the duration of the user's hand trigger action exceeds a preset time threshold; or
    counting number of times of performing the user's hand trigger action when the user's hand action satisfies the preset trigger action; and
    triggering the local perspective function of the virtual reality equipment when the number of times of performing the user's hand trigger action reaches a preset number of times of performing.

6. A local perspective device of a virtual reality equipment, comprising:
    a hand action identification unit for identifying a user's hand action;
    a local perspective function triggering unit for triggering a local perspective function of the virtual reality equipment when the user's hand action satisfies a preset trigger action;
    a local perspective display area determination unit for, under the local perspective function, determining a local perspective display area in a virtual scene according to a position of the user's hand action, so as to display a real scene in the local perspective display area, wherein determining the local perspective display area comprises:
        determining a position of at least one finger in the user's hand action, and
        determining the local perspective display area in the virtual scene according to the position of at least one finger in the user's hand action, wherein the local perspective display area determination unit is further configured to: determining a shape and a position of the local perspective display area according to the position of at least one finger in the user's hand action, and determining the local perspective display area in the virtual scene according to the shape and the position of the local perspective display area and the position of at least one finger in the user's hand action;
    a position change determination unit for determining whether the position of the user's hand action has changed; and
    a local perspective display area updating unit for updating the local perspective display area in the virtual scene according to a changed position of the user's hand action when the position of the user's hand action has changed.

7. The device according to claim 6, wherein the preset trigger action includes a one-hand trigger action, and
    the local perspective display area determination unit is specifically for:
    when the user's one-hand action satisfies the one-hand trigger action, determining positions of an index finger and a thumb of the user's one-hand action; and
    generating a circular perspective display area in the virtual scene according to the positions of the index finger and the thumb of the user's one-hand action.

8. The device according to claim 6, wherein the preset trigger action includes a two-hand trigger action, and
    the local perspective display area determination unit is specifically for:
    when the user's two-hand action satisfies the two-hand trigger action, determining positions of two index fingers and two thumbs of the user's two-hand action; and generating a triangular perspective display area in the virtual scene according to the positions of the two index fingers and the two thumbs of the user's two-hand action.

9. The device according to claim 6, further comprising:
a local perspective function turning-offing unit for, when the user's hand action satisfies a preset turning-off action, turning off the local perspective function of the virtual reality equipment.

10. The device according to claim 6, wherein the local perspective function triggering unit is further configured to:
counting a duration of the user's hand trigger action when the user's hand action satisfies the preset trigger action; and
triggering the local perspective function of the virtual reality equipment when the duration of the user's hand trigger action exceeds a preset time threshold; or
counting number of times of performing the user's hand trigger action when the user's hand action satisfies the preset trigger action; and
triggering the local perspective function of the virtual reality equipment when the number of times of performing the user's hand trigger action reaches a preset number of times of performing.

11. A virtual reality equipment, comprising a processor and a memory for storing computer executable instructions, wherein when executed by the processor, the executable instruction implements a local perspective method, the local perspective method comprises:
identifying a user's hand action;
triggering a local perspective function of the virtual reality equipment when the user's hand action satisfies a preset trigger action;
under the local perspective function, determining a local perspective display area in a virtual scene according to a position of the user's hand action, so as to display a real scene in the local perspective display area, wherein determining the local perspective display area comprises:
determining a position of at least one finger in the user's hand action, and
determining the local perspective display area in a virtual scene according to the position of at least one finger in the user's hand action, wherein determining a local perspective display area in the virtual scene according to the position of at least one finger in the user's hand action comprises: determining a shape and a position of the local perspective display area according to the position of at least one finger in the user's hand action, and determining the local perspective display area in the virtual scene according to the shape and the position of the local perspective display area and the position of at least one finger in the user's hand action;

determining whether the position of the user's hand action has changed; and
when the position of the user's hand action has changed, updating the local perspective display area in the virtual scene according to a changed position of the user's hand action.

12. The virtual reality equipment according to claim 11, wherein the preset trigger action includes a one-hand trigger action, and
under the local perspective function, determining a local perspective display area in a virtual scene according to a position of the user's hand action comprises:
when the user's one-hand action satisfies the one-hand trigger action, determining positions of an index finger and a thumb of the user's one-hand action
generating a circular perspective display area in the virtual scene according to the positions of the index finger and the thumb of the user's one-hand action.

13. The virtual reality equipment according to claim 11, wherein the preset trigger action includes a two-hand trigger action, and
under the local perspective function, determining a local perspective display area in a virtual scene according to a position of the user's hand action comprises:
when the user's two-hand action satisfies the two-hand trigger action, determining positions of two index fingers and two thumbs of the user's two-hand action
generating a triangular perspective display area in the virtual scene according to the positions of the two index fingers and the two thumbs of the user's two-hand action.

14. The virtual reality equipment according to claim 11, the local perspective method further comprises:
when the user's hand action satisfies a preset turning-off action, turning off the local perspective function of the virtual reality equipment.

15. The virtual reality equipment according to claim 11, wherein triggering a local perspective function of the virtual reality equipment when the user's hand action satisfies a preset trigger action comprising:
counting a duration of the user's hand trigger action when the user's hand action satisfies the preset trigger action; and
triggering the local perspective function of the virtual reality equipment when the duration of the user's hand trigger action exceeds a preset time threshold; or
counting number of times of performing the user's hand trigger action when the user's hand action satisfies the preset trigger action; and
triggering the local perspective function of the virtual reality equipment when the number of times of performing the user's hand trigger action reaches a preset number of times of performing.

* * * * *